United States Patent [19]

Ishikawa

[11] Patent Number: 5,754,428
[45] Date of Patent: May 19, 1998

[54] METHOD OF CONTROLLING SPEED REDUCTION RATIO IN A CONTINUOUSLY VARIABLE TRANSMISSION

[75] Inventor: Yoshikazu Ishikawa, Saitama, Japan

[73] Assignee: Honda Giken Kogyo Kabushiki Kaisha, Tokyo, Japan

[21] Appl. No.: 595,394

[22] Filed: Oct. 10, 1990

[30] Foreign Application Priority Data

Oct. 16, 1989 [JP] Japan ................................ 1-268692

[51] Int. Cl.$^6$ .................................................. B60K 41/18
[52] U.S. Cl. ............................................ 364/424.1; 477/37
[58] Field of Search ......................... 364/424.1; 74/854, 74/865, 866; 477/37, 43, 900, 904

[56] References Cited

U.S. PATENT DOCUMENTS

| | | | |
|---|---|---|---|
| 4,389,910 | 6/1983 | Lockhart | 74/843 |
| 4,589,071 | 5/1986 | Yamamuro et al. | 364/424.1 |
| 4,637,280 | 1/1987 | Oshiage | 74/866 |
| 4,638,690 | 1/1987 | Hattori et al. | 74/866 |
| 4,643,048 | 2/1987 | Hattori et al. | 74/866 |
| 4,645,045 | 2/1987 | Takefuta | 364/424.1 X |
| 4,735,114 | 4/1988 | Satoh et al. | 74/866 |
| 4,789,936 | 12/1988 | Kurihara et al. | 364/424.1 |
| 4,833,612 | 5/1989 | Okuno et al. | 364/424.1 X |
| 4,962,679 | 10/1990 | Ishikawa et al. | 74/866 |
| 4,977,992 | 12/1990 | Ohtsuka et al. | 364/424.1 X |
| 4,989,149 | 1/1991 | Mimura et al. | 364/424.1 X |
| 5,040,114 | 8/1991 | Ishikawa et al. | 364/424.1 |

FOREIGN PATENT DOCUMENTS

| | | |
|---|---|---|
| 0026470 | 4/1981 | European Pat. Off. . |
| 0389262 | 9/1990 | European Pat. Off. . |
| 2154763 | 9/1985 | United Kingdom . |

OTHER PUBLICATIONS

English summary of 61-119856 Japanese Application and English summary of Japanese Appln. No. 63-170134.

*Primary Examiner*—Collin W. Park
*Attorney, Agent, or Firm*—Lyon & Lyon

[57] ABSTRACT

A continuously variable transmission is controlled using a target acceleration map which contains values of target accelerations corresponding to a plurality of values of a first indication (e.g., the amount of depression of an accelerator pedal or the engine throttle opening) representative of the driver's intention for acceleration or deceleration and a plurality of values of a second indication representative of speeds of the motor vehicle. The target acceleration map is arranged such that when each of the values of the second indication is constant, each of the values of the target acceleration increases as the value of the first indication increases, at a rate which is greater if the first indication is smaller. From such a target acceleration map, a target acceleration is determined on the basis of the actual values of the values of the first and second indications at the time, and the speed reduction ratio of the transmission is controlled so that the target acceleration is achieved. In the target acceleration map, the cruising speed of the motor vehicle varies linearly as the values of the first indication vary.

18 Claims, 14 Drawing Sheets

METHOD OF CONTROLLING SPEED REDUCTION RATIO IN A CONTINUOUSLY VARIABLE TRANSMISSION

BACKGROUND OF THE INVENTION

The present invention relates to a method of controlling an automatic transmission on a motor vehicle or the like, which automatic transmission is of the continuously variable type.

Heretofore, continuously variable transmissions are generally controlled such that (a) the rotational speed of an engine coupled to the continuously variable transmission will reach a target speed, (b) the rate of change of the rotational speed of the engine will reach a target rate, and (c) the speed reduction ratio or transmission ratio of the transmission will reach a target ratio.

According to another method of controlling a continuously variable transmission, the rate of change of a speed reduction ratio is controlled, the rate being calculated as the sum of a component corresponding to a predicted acceleration that is calculated from reserve power of an engine coupled to the transmission and a component corresponding to a target rate of change of the engine rotational speed (see, for example, Japanese Laid-Open Patent Publication No. 63-53343 filed by the applicant). The term "reserve power" referred to above means the difference between the power which can be produced by the engine depending on a depression of the accelerator pedal and the actual power which is produced by the engine at the time. The reserve power serves to accelerate the motor vehicle.

In view of the fact that the accelerator pedal depression is an indication of the intention of the driver for acceleration or deceleration, there has been disclosed a transmission control method in which a target drive power is established depending on the depth to which the accelerator pedal is depressed (the amount of depression of the accelerator pedal) and the vehicle speed, and the transmission is controlled so as to equalize the actual drive power with the target drive power (see Japanese Patent Publication No. 61-119856). It is also known that the amount of depression of the accelerator pedal and the vehicle drive power are established such that they vary proportionally and linearly (see Japanese Laid-Open Patent Publication No. 63-170134).

While the motor vehicle is cruising with the accelerator pedal being depressed to a certain depth, the vehicle speed (cruising speed) and the amount of depression of the accelerator pedal are not linearly related to each other according to the above conventional transmission control methods. For example, as indicated by a curve A in FIG. 12 of the accompanying drawings, when the amount of depression of the accelerator pedal is small (i.e., when the accelerator opening $\theta_{AP}$ is $\theta1$), a change (indicated by the gradient of the curve A at a point A1) in the cruising speed may be relatively large with respect to a change in the amount of depression of the accelerator pedal. When the amount of depression of the accelerator pedal is large (i.e., when the accelerator opening $\theta_{AP}$ is $\theta2$), a change (indicated by the gradient of the curve A at a point A2) in the cruising speed may be relatively small with respect to a change in the amount of depression of the accelerator pedal. Conversely, as indicated by a curve B in FIG. 12, when the amount of depression of the accelerator pedal is small (i.e., when the accelerator opening $\theta_{AP}$ is $\theta1$), a change (indicated by the gradient of the curve B at a point B1) in the cruising speed may be relatively small with respect to a change in the amount of depression of the accelerator pedal. When the amount of depression of the accelerator pedal is large (i.e., when the accelerator opening $\theta_{AP}$ is $\theta2$), a change (indicated by the gradient of the curve B at a point A2) in the cruising speed may be relatively large with respect to a change in the amount of depression of the accelerator pedal.

The Japanese Laid-Open Patent Publication No. 63-170134 discloses that when the accelerator pedal is depressed for accelerating the motor vehicle from a cruise, the amount ($\theta_{AP}$) of depression of the accelerator pedal, which is an acceleration demanding value, and the drive power (F) are controlled so as to vary linearly insofar as the vehicle speed (V) is constant. Since the drive power corresponds to the acceleration, the acceleration varies linearly with respect to the depression of the accelerator pedal.

With the above control process, when the amount of depression of the accelerator pedal is small, the acceleration as it is actually felt by the driver is small, resulting in a problem in that the acceleration as felt by the driver is not sufficient compared to the real depression of the accelerator pedal. FIG. 14 illustrates the relationship of the rate of change ($G/\Delta\theta_{AP}$) of the acceleration G to the amount $\Delta\theta_{AP}$ of depression of the accelerator pedal for acceleration from a cruise. The curve C in FIG. 14 represents the rate of change ($G/\Delta\theta_{AP}$) of the acceleration which is required to make the acceleration as felt by the driver match the depression of the accelerator pedal. As can be seen from FIG. 14, in order to obtain the acceleration as it is felt which match the accelerator pedal depression, the rate of change ($G/\Delta_{AP}$) of the acceleration is required to be larger when the amount $\Delta\theta_{AP}$ of depression of the accelerator pedal is small than when the amount $\Delta\theta_{AP}$ of depression of the accelerator pedal is large. Therefore, if the actual acceleration is controlled so as to vary linearly with respect to the depression of the accelerator pedal, then it is difficult to satisfy the demand from the driver for acceleration.

Heretofore, since the cruising speed does not vary linearly with respect to the amount of depression of the accelerator pedal as shown in FIG. 12, the driver learns such a nonlinear relationship through experience. If the driver's learning is not enough, then the vehicle speed may get higher or lower than expected by the driver when the accelerator pedal is depressed as if the vehicle is running at a medium or high speed while the vehicle is actually running at a low speed. Consequently, the vehicle cannot run at a cruising speed demanded by the driver, but the driver may have to release or further depress the accelerator pedal after it has been depressed. For the above reasons, the conventional transmission control methods do not allow the driver to control the accelerator pedal with ease.

SUMMARY OF THE INVENTION

It is an object of the present invention to provide a method of controlling the speed reduction ratio of a continuously variable transmission on a motor vehicle to enable the motor vehicle to run in a manner to give the driver an optimum acceleration feeling which matches the intention of the driver according for acceleration or deceleration, so that the demand of the driver for acceleration can be satisfied.

Another object of the present invention is to provide a method of controlling the speed reduction ratio of a continuously variable transmission to cause the cruising speed of a motor vehicle to vary linearly with respect to the amount of depression of an accelerator pedal, so that the driver of the motor vehicle can control the accelerator pedal with ease.

To achieve the above objects, according to the present invention, the speed reduction ratio of a continuously variable transmission is controlled using a target acceleration map which contains target accelerations corresponding to first indications (e.g., the amount of depression of an accelerator pedal or the engine throttle opening) representative of the driver's intention for acceleration or deceleration and second indications representative of speeds of the motor vehicle, the target acceleration map being arranged such that when each of the second indications is constant, each of the target accelerations increases as the first indication increases, at a rate which is greater if the first indication is smaller. From such a target acceleration map, a target acceleration is determined on the basis of the actual values of the first and second indications at the time, and the speed reduction ratio of the continuously variable transmission is controlled so that the target acceleration is achieved.

In the target acceleration map, cruising speeds of the motor vehicle vary linearly as the first indications vary. From this target acceleration map, a target acceleration is determined on the basis of the actual values of the first and second indications at the time, and the speed reduction ratio of the continuously variable transmission is controlled so that the target acceleration is achieved. The cruising speeds are those vehicle speeds at which the motor vehicle runs steadily, i.e., the acceleration is zero.

When the driver depresses the accelerator pedal in order to accelerate the motor vehicle while it is running, an optimum target acceleration is read from the target acceleration map based on the vehicle speed and the amount of depression of the accelerator pedal at this time. Then, the speed reduction ratio of the continuously variable transmission is controlled in order to obtain the target acceleration. In the target acceleration map, the rate of change of the target acceleration increases as the amount of depression of the acceleration increases, at a rate which is greater when the amount of depression of the accelerator pedal is smaller. Such characteristics satisfy the demand from the driver for vehicle acceleration or deceleration, so that the driver is given a good acceleration feeling. Since the cruising speeds are linearly variable with the depression of the accelerator pedal, the driver can control the accelerator pedal with ease at those cruising speeds.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus are not limitative of the present invention and wherein.

DETAILED DESCRIPTION OF THE PREFERRED EMBODIMENTS

Figure 1:
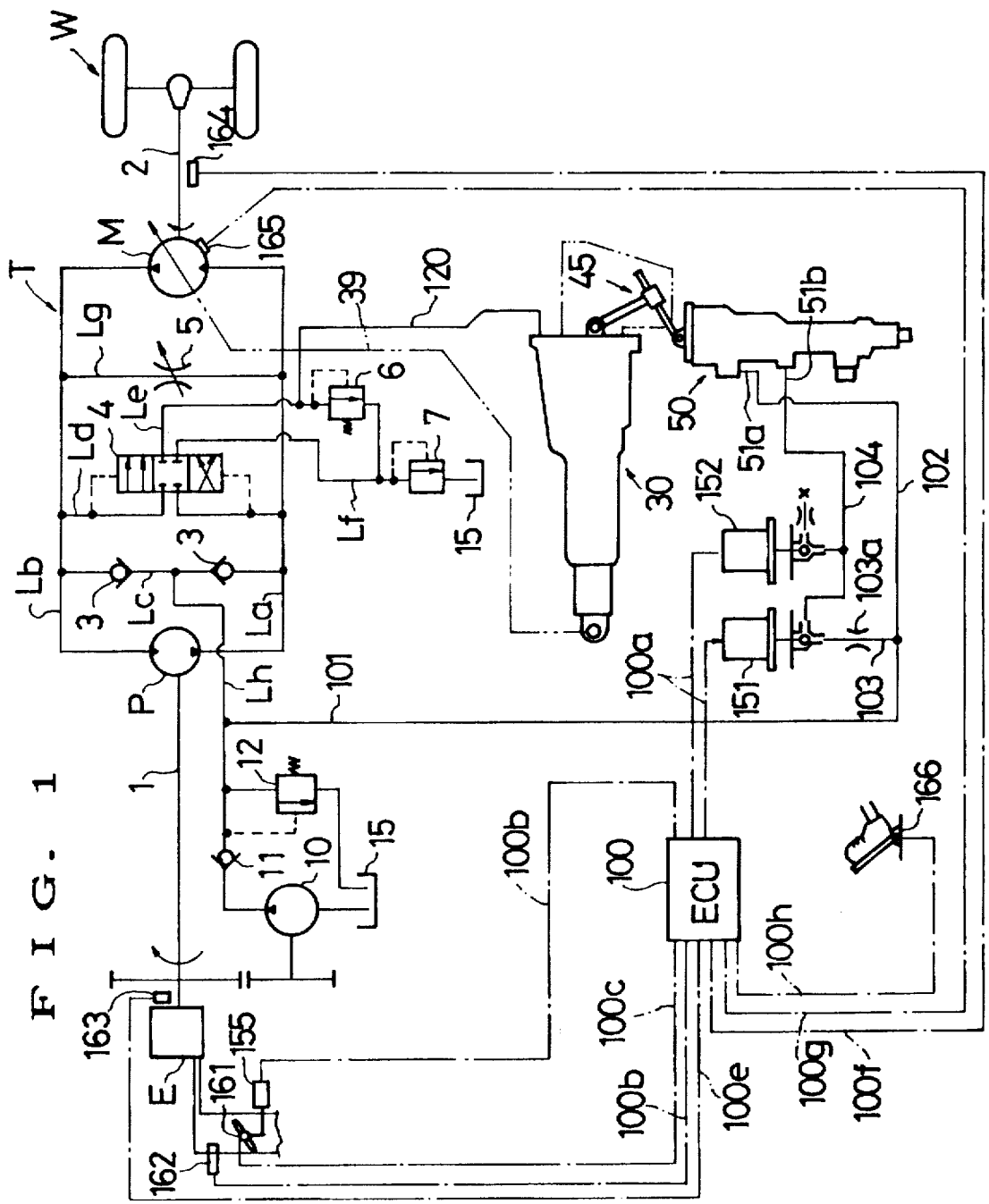
FIG. 1 is a circuit diagram of a hydraulic circuit of a continuously variable transmission to be controlled by a method of the present invention.

FIG. 1 shows a hydraulic circuit of a continuously variable transmission which is to be controlled by a control method according to the present invention. The continuously variable transmission, generally designated by the reference numeral T, has a fixed-displacement hydraulic pump P drivable by an engine E on a motor vehicle through an input shaft 1 and a variable-displacement hydraulic motor M having an output shaft 2 for driving road wheels W of the motor vehicle. The hydraulic pump P and the hydraulic motor M are hydraulically connected to each other through a closed hydraulic circuit including a first oil passage La interconnecting the outlet port of the pump P and the inlet port of the motor M and a second oil passage Lb interconnecting the inlet port of the pump P and the outlet port of the motor M.

A charging pump 10 drivable by the engine E has an outlet port connected to the closed hydraulic circuit through a charging oil passage Lh having a check valve 11 and a third oil passage Lc having a pair of check valves 3. Working oil supplied from an oil sump 15 by the charging pump 10 and regulated in pressure by a charging pressure relief valve 12 is supplied through one of the check valves 3 to a lower-pressure one of the oil passages La, Lb. To the closed hydraulic circuit, there is also connected a fourth oil passage Ld having a shuttle valve 4 coupled to fifth and sixth oil passages Le, Lf having higher- and lower-pressure relief valves 6, 7 and connected to the oil sump 15. The shuttle valve 4 which comprises a two-port three-position directional control valve is operable in response to the difference between oil pressures in the first and second oil passages La, Lb for connecting a higher-pressure one of the first and second oil passages La, Lb to the fifth oil passage Le and the lower-pressure oil passage to the sixth oil passage Lf. Therefore, the oil pressure relieved from the higher-pressure oil passage is regulated by the higher-pressure relief valve 6, whereas the oil pressure relieved from the lower-pressure oil passage is regulated by the lower-pressure relief valve 7.

Between the first and second oil passages La, Lb, there is connected a seventh oil passage Lg having a clutch valve 5 which comprises a variable restriction controlled by an opening control unit (not shown) for controlling the opening of the seventh oil passage Lg. The transmission of the drive power from the hydraulic pump P to the hydraulic motor M can be controlled through the control of the cross-sectional flow area in the clutch valve 5.

An actuator for controlling the displacement of the hydraulic motor M to control the speed reduction ratio or transmission ratio of the continuously variable transmission T comprises a pair of first and second servounits 30, 50 mechanically operably coupled to each other by a link mechanism 45. The hydraulic motor M comprises a swash-plate axial-piston motor whose displacement can be controlled by controlling the angle of the swash plate thereof.

The structure and operation of the servounits 30, 50 will be described below with reference to FIGS. 1 and 2.

The higher-pressure working oil supplied from the closed hydraulic circuit of the continuously variable transmission T through the shuttle valve 4 to the fifth oil passage Le is introduced into the first servounit 30 through a high-pressure line 120 branched from the fifth oil passage Le. The first servounit 30 controls the swash plate angle of the hydraulic motor M under the higher-pressure working oil thus introduced. The second servounit 50 controls operation of the first servounit 30 through the link mechanism 45 by which the second servounit 50 is operatively coupled to the first servounit 30.

The first servounit 30 comprises a housing 31 having a port 31a connected to the high-pressure line 120, a piston member 32 slidably disposed in the housing 31, and a spool member 34 coaxially slidably disposed in the piston 32. The piston member 32 has a piston 32a on its righthand (as shown) end, and a cylindrical rod 32b extending coaxially from the piston 32a to the left (as shown). The piston 32a is positioned in a cylinder hole 31c defined in the housing 31 and divides the space of the cylinder hole 31c into left and right (as shown) cylinder chambers 35, 36. The rod 32b is slidably fitted in a rod hole 31d which is smaller in diameter than and extends coaxially from the cylinder hole 31c. The right cylinder chamber 35 is closed by a plug 33a and a cover 33b. The spool member 34 extends through the piston 32a, the right cylinder chamber 36, the plug 33a, and the cover 33b.

The left cylinder chamber 35 communicates with the high-pressure line 120 through an oil passage 31b defined in the housing 31. The piston member 32 can therefore be moved to the right under the oil pressure introduced from the high-pressure line 120 into the left cylinder chamber 35.

The spool member 34 has on its distal end a land 34a closely fitted in a spool hole 32d defined coaxially in the rod 32b. The spool member 34 also has a recess 34b defined on the righthand side of the land 34a by a pair of diametrically opposite cutouts, the recess 34b having a predetermined axial dimension. A retaining ring 37 is fitted over the spool member 34 on the righthand side of the recess 34b. The spool member 34 is prevented from removal from the piston member 32 by the retaining ring 37 upon engagement with another retaining ring 38 locked in an inner peripheral surface of the piston member 32.

The piston member 32 has defined therein a discharge passage 32e for opening the right cylinder chamber 36 into an oil sump (not shown) through the spool hole 32d upon rightward movement of the spool member 34, and a communication passage 32c for bringing the right cylinder chamber 36 into communication with the left cylinder chamber 35 through the recess 34b upon leftward movement of the spool member 34.

Figure 2:
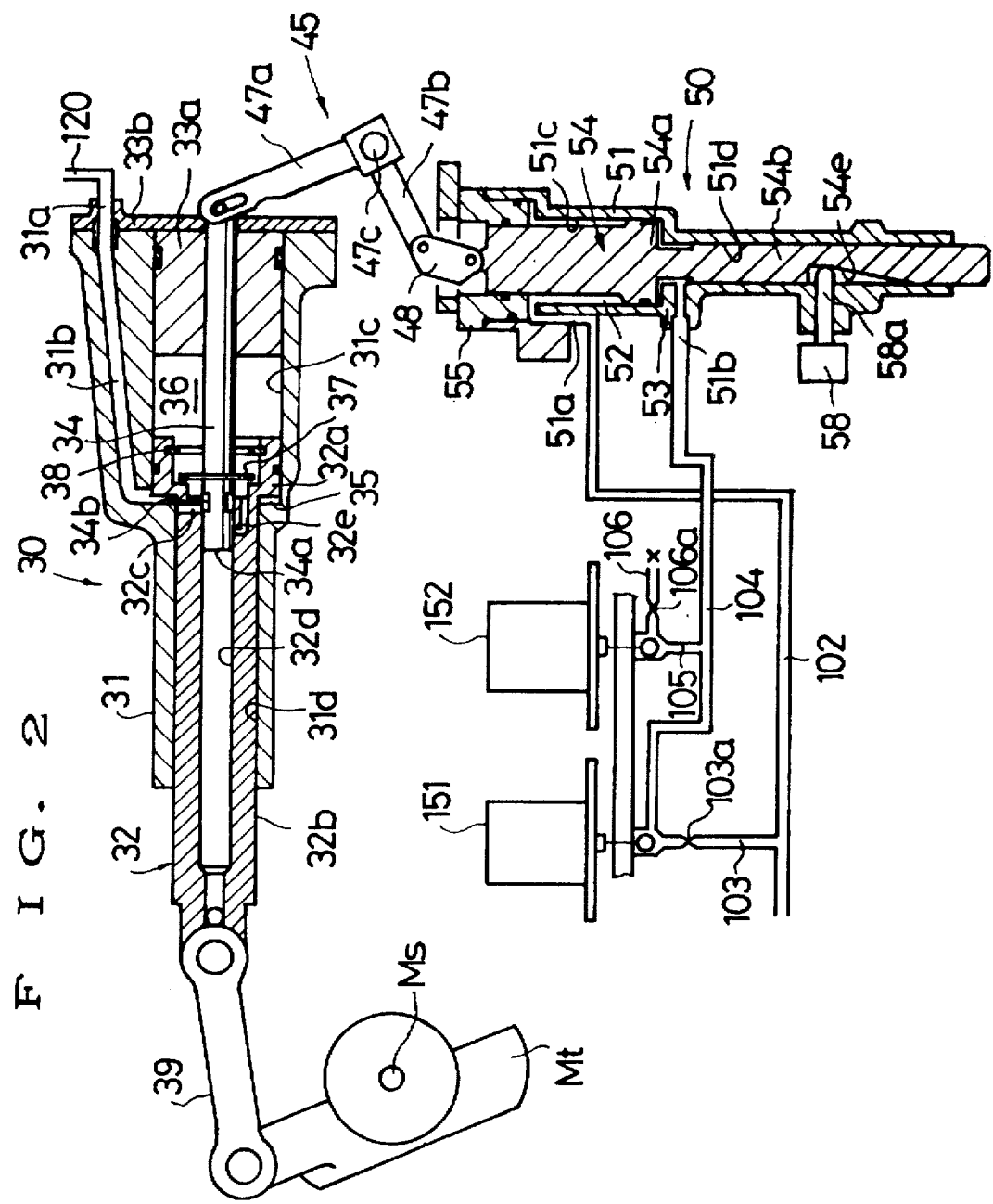
FIG. 2 is a cross-sectional view of servounits for controlling the continuously variable transmission.

When the spool member 34 is moved to the right from the position shown in FIG. 2, the land 34a closes the communication passage 32c and opens the discharge passage 32e. Therefore, the oil supplied under pressure from the high-pressure line 120 through the oil passage 31b acts in only the left cylinder chamber 35, thus moving the piston member 32 to the right in follow-up coaction with the spool member 34.

When the spool member 34 is then moved to the left, the recess 34b opens the communication passage 32c into the right cylinder chamber 36, and the land 34a closes the discharge chamber 32e. The high-pressure oil from the high-pressure line 120 then acts in both the left and right cylinder chambers 35, 36. Since the piston 32a has different pressure-bearing surface areas on its axially opposite sides, i.e., the righthand pressure-bearing surface area is greater than the lefthand pressure-bearing surface area, the piston 32 is moved to the left in follow-up coaction with the spool member 34.

When the spool member 34 is stopped somewhere in its stroke, because the oil pressures in the cylinder chambers 35, 36 are maintained in equilibrium, the piston member 32 is kept in a hydraulically balanced condition and is also stopped.

Therefore, by moving the spool member 34 to the left or right, the piston member 32 is moved in follow-up unison with the spool member 34 under the pressure of the oil supplied from the high-pressure line 120. The piston member 32 then causes a link 39 coupled thereto to turn the swash plate Mt of the hydraulic motor M about a shaft Ms for thereby varying the displacement of the hydraulic motor M.

The spool member 34 is operatively coupled to the second servounit 50 by the link mechanism 45. The link mechanism 45 comprises a first link 47 rotatable about a shaft 47c and having two substantially perpendicular arms 47a, 47b, and a second link 48 joined by a pin to the lower distal end of the arm 47b of the first link 47. The upper end of the arm 47a is connected by a pin to the righthand end of the spool member 34 of the first servounit 30. The lower end of the second link 48 is coupled by a pin to a vertical (as shown) spool member 54 of the second servounit 50. Consequently, vertical movement of the spool member 54 of the second servounit 50 causes the spool member 34 of the first servounit 30 to move to the left or right.

The second servounit 50 has a housing 51 having two ports 51a, 51b to which two oil pressure lines 102, 104 are connected, respectively, and the spool member 54 is vertically slidably disposed in the housing 51. The spool member 54 comprises a piston 54a and a rod 54b extending coaxially downwardly from the piston 54a. The piston 54a is slidably fitted in a cylinder hole 51c defined vertically in the housing 51. The cylinder hole 51c is closed by a cover 55, defining a cylinder chamber therein which is divided by the piston 54a into upper and lower cylinder chambers 52, 53. The rod 54b is slidably fitted in a rod hole 51d which is defined coaxially in the housing 51 and extends downwardly from the cylinder hole 51c.

The rod 54b has a recess 54e defined in a peripheral surface and having a tapered surface. A top position detector switch 58 has a spool 58a projecting into the recess 54e. When the spool member 54 moves upwardly, the spool 58a is lifted in a direction away from the rod 54b as the tip end of the spool 58a slides up the tapered surface. Therefore, the top position detector switch 58 can detect when the transmission ratio of the hydraulic motor M is minimum.

The upper and lower cylinder chambers 52, 53 defined by the piston 54a communicate respectively with the oil pressure lines 102, 104 through the ports 51a, 51b. The spool member 54 is moved upwardly or downwardly depending on the magnitude of an oil pressure applied to the piston 54a, the oil pressure being determined by the pressure of working oil supplied through the lines 102, 104 and the pressure-bearing surface areas of the piston 54a in the cylinder chambers 52, 53. The vertical movement of the spool member 54 is transmitted through the link mechanism 45 to the spool member 34 of the first servounit 30 thereby to move the spool member 34 to the left or right. Accordingly, by controlling the oil pressure supplied through the oil pressure lines 102, 104, the movement of the spool member 34 of the first servounit 30 can be controlled to move the piston member 32 for thereby controlling the swash plate angle of the hydraulic motor M, so that the displacement of the motor M will be controlled to control the transmission ratio or speed reduction ratio. Specifically, when the spool member 54 of the second servounit 50 is moved upwardly, the piston member 32 of the first servounit 30 is moved to the right to reduce the swash plate angle of the hydraulic motor M for reducing the displacement of the motor M and hence the speed reduction ratio.

Oil pressure which is supplied to the upper cylinder chamber 52 through the port 51a from the oil pressure line 102 is introduced from the charging pump 10, while being regulated by the charging pressure relief valve 12, through an oil pressure line 101. Oil pressure which is supplied to the lower cylinder chamber 53 through the port 51b is introduced from an oil pressure line 103 branched from the oil pressure line 102 and having an orifice 103a, while being regulated by two duty-ratio-controlled solenoid-operated valves 151, 102, through an oil pressure line 104. The solenoid-operated valve 151 is opened and closed depending on a given duty ratio to control the rate of flow of working oil from the oil pressure line 103 to the oil pressure line 104. The solenoid-operated valve 152 is connected between an oil pressure line 105 branching from the oil pressure line 104 and an oil pressure line 106 connected to a drain through an orifice 106a. The solenoid-operated valve 152 is opened and closed depending on a given duty ratio to control the rate of flow of working oil from the oil pressure line 104 to the drain.

Therefore, the upper cylinder chamber 52 is supplied through the oil pressure line 102 with the charging oil pressure which has been regulated by the charging pressure relief valve 12. The oil pressure line 104 supplies the lower cylinder chamber 53 with an oil pressure which is made lower than the charging oil pressure by the two solenoid-operated valves 151, 152. Since the pressure-bearing surface area of the upper cylinder chamber 52 is smaller than that of the lower cylinder chamber 53, the forces acting on the opposite sides of the spool member 54 under the oil pressures in the upper and lower cylinder chambers 52, 53 are brought into equilibrium when the oil pressure Pu in the upper cylinder chamber 52 is higher than a certain level P1 of the oil pressure in the lower cylinder chamber 53 (Pu>P1). Therefore, by controlling the solenoid-operated valves 151, 152 to increase the oil pressure supplied to the lower cylinder chamber 53 above the pressure level P1, the spool member 54 is moved upwardly to reduce the swash plate angle of the hydraulic motor M for thereby reducing the speed reducing ratio, and by controlling the solenoid-operated valves 151, 152 to reduce the oil pressure supplied to the lower cylinder chamber 53 below the pressure level P1, the spool member 54 is moved downwardly to increase the swash plate angle of the hydraulic motor M for thereby increasing the speed reducing ratio.

The solenoid-operated valves 151, 152 are controlled by a control signal fed from a controller 110 over a signal line 100a.

As shown in FIG. 1, the controller 110 is supplied with a throttle valve opening signal θth applied from an engine throttle valve opening sensor 161 over a signal line 100c, an intake vacuum signal $P_B$ delivered over a signal line 100d from a vacuum sensor 162 which detects the intake vacuum in an intake manifold, an engine rotational speed signal N delivered from an engine rotational speed sensor 163 over a signal line 100e, a vehicle speed signal V delivered over a signal line 100f from a vehicle speed sensor 164 which detects the vehicle speed based on the rotational speed of the output shaft 2, a swash plate angle signal θth delivered over a signal line 100g from a swash plate angle sensor 165 which detects the swash plate angle of the hydraulic motor M, and an accelerator opening signal $\theta_{AP}$ delivered from an accelerator pedal movement sensor 166 over a signal line 100h. The controller 110 produces a control signal based on the above input signals applied thereto and applies the control signal to the solenoid-operated valves 151, 152 to achieve desired running performance of the motor vehicle.

The controller 100 also sends a control signal over a line 100b to a throttle valve actuator 155 which controls the opening of the throttle valve. The controller 100 produces this control signal based on the input signals for controlling operation of the throttle valve actuator 155 to achieve desired running performance of the motor vehicle.

Operation of the controller 100 to control the transmission T will be described below.

The speed reduction ratio or transmission ratio i (=input shaft rotational speed/output shaft rotational speed) of the continuously variable transmission T is expressed by:

$$i = \frac{Ne}{C \times V} \quad (1)$$

where Ne is the engine rotational speed, V is the vehicle speed, and C is a constant. The rate di/dt of change of the speed reduction ratio i is determined by differentiating the equation (1) with respect to time t, and given by the following equation (2):

$$di/dt = \frac{1}{C \times V} \times \left( dNe/dt - \frac{Ne}{C \times V} \times C \times dV/dt \right) \quad (2)$$

where dNe/dt is the rate of change of the engine rotational speed, and dV/dt (=G) is the acceleration of the motor vehicle. If the target rate of change of the engine rotational speed is indicated by dNeo/dt, the acceleration dV/dt (=G) is the predicted acceleration Ga, and C'=1/C, then the rate di/dt of change of the speed reduction ratio is given by:

$$di/dt = C' \times \frac{1}{V} \times dNeo/dt - C' \times \frac{Ne}{V^2} \times Ga \quad (3)$$

Therefore, the rate di/dt of change of the speed reduction ratio is represented by the sum of a component $di_N/dt$ (=C'×1/V×dNeo/dt) corresponding to the target rate dNeo/dt of change of the engine rotational speed and a component dip/dt (=−C'×Ne/V²×Ga) corresponding to the predicted acceleration Ga. The predicted acceleration Ga is derived from the equations (4) through (7) given below.

The output power Pe of the engine E is expressed by:

$$Pe = R\mu + Ra + Pa \quad \ldots (4)$$

where R is the resistance from the road surface to the motor vehicle, Ra is the resistance of air to the motor vehicle, and Pa is the reserve power of the engine E. From the equation (4), the reserve power Pa of the engine E is derived as follows:

$$Pa = Pe - (R\mu + Ra) \qquad \ldots (5)$$

The reserve power Pa is a horsepower of the engine output which is not utilized at the time, and is used to accelerate the motor vehicle.

The reserve power Pa can also be given by the equation (6):

$$Pa = (W + \Delta W) \times \frac{1}{g} \times Ga \times \left( \frac{V \times 10^3}{60^2} \right) \times \frac{1}{75} \qquad (6)$$

where g is the gravitational acceleration (9.8 m/s²), W is the total weight of the motor vehicle, and ΔW is the equivalent weight of the rotating parts of the engine E. From the equation (6), we get:

$$Ga = Pa \times \frac{g \times 60^2 \times 75}{(W + \Delta W) \times (V \times 10^3)} \qquad (7)$$

Therefore, the predicted acceleration Ga can be calculated from the reserve power Pa of the engine E, and the reserve power Pa is determined according to the equation (5).

From the predicted acceleration Ga given by the equation (7) above, the component $di_p/dt$ corresponding to the predicted acceleration is expressed as follows:

$$\begin{aligned} di_p/dt &= -C \times \frac{Ne}{V^2} \times Pa \times \frac{g \times 60^2 \times 75}{(W + \Delta W) \times (V \times 10^3)} \qquad (8) \\ &= -C_2 \times \frac{Ne}{V^3} \times Pa \end{aligned}$$

where $C_2$ is a constant.

Therefore, the rate di/dt of change of the speed reduction ratio can be expressed as follows:

$$di/dt = C_1 \times \frac{1}{V} \times dNeo/dt - C_2 \times \frac{Ne}{V^3} \times Pa \qquad (9)$$

where $C_1$ is a constant. The terms of the above equation can be weighted by varying the constant $C_1$, $C_2$.

The target rate dNeo/dt of change of the engine rotational speed is determined by calculating the difference ΔNe between the target engine rotational speed Neo which is set according to an indication of the driver's intention for acceleration or deceleration, such as the amount of depression of the accelerator pedal, for example, and the actual engine rotational speed Ne, and finding a suitable value from a table which contains predetermined target rates dNeo/dt that correspond to the speed differences ΔNe in view of vehicle running conditions as felt by the driver and fuel consumption.

Consequently, when a reserve power Pa to obtain a desired acceleration is established by controlling the throttle valve and the transmission is controlled using the rate di/dt of change of the speed reduction ratio which is determined according to the equation (8) above, the desired acceleration can be achieved.

A control sequence for controlling the speed reduction ratio and the throttle valve to establish and obtain the target acceleration will be described below with reference to the flowchart of FIG. 3 and also FIGS. 4 and 5. FIG. 4 shows a control block diagram for effecting a throttle valve control process based on the flowchart of FIG. 3, and FIG. 5 shows a control block diagram for effecting a speed reduction ratio control process based on the flowchart of FIG. 3.

Figure 3:
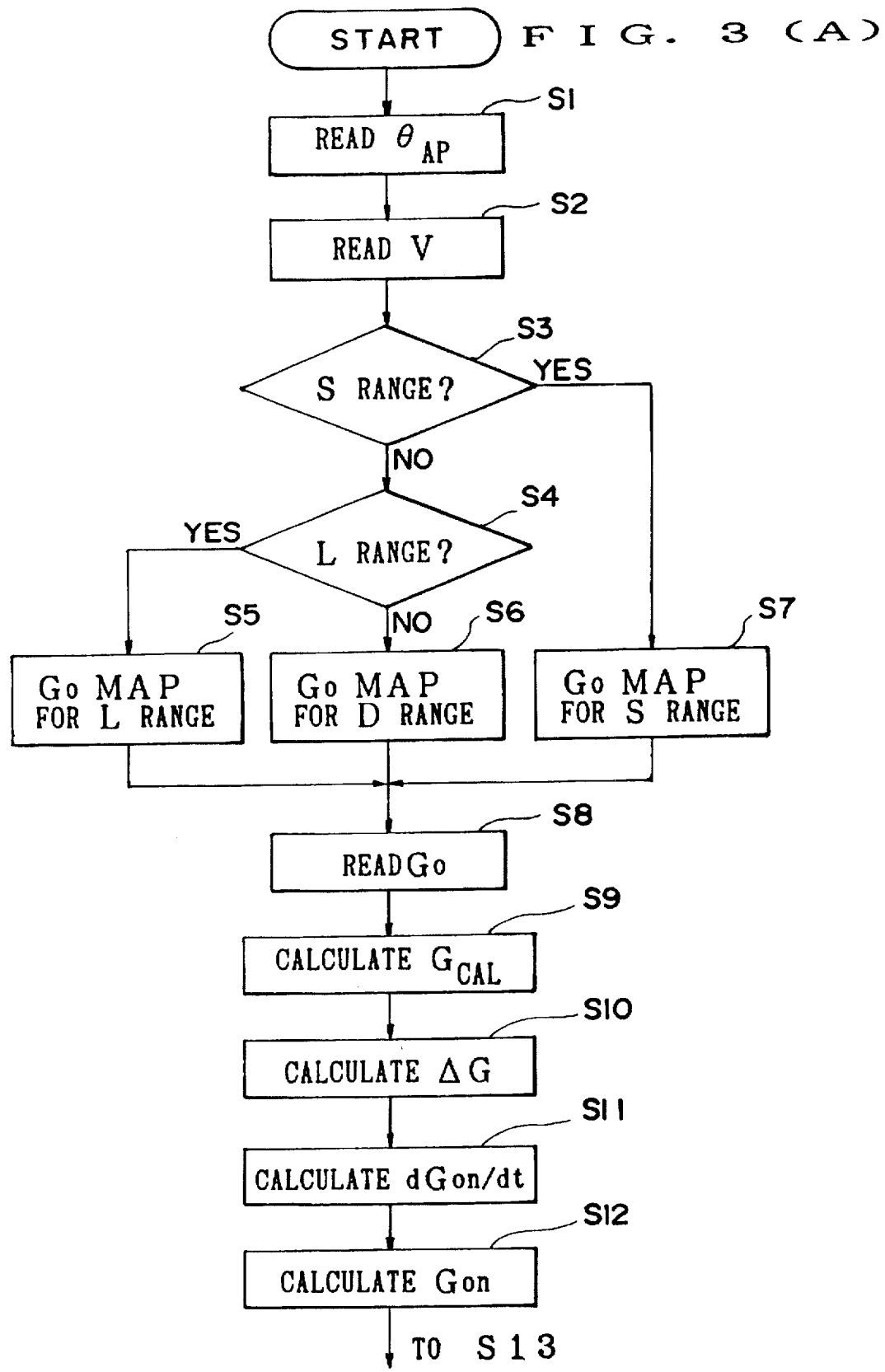
FIGS. 3(A) and 3(B) show a flowchart of a control process of the method according to the invention.
Figure 3:
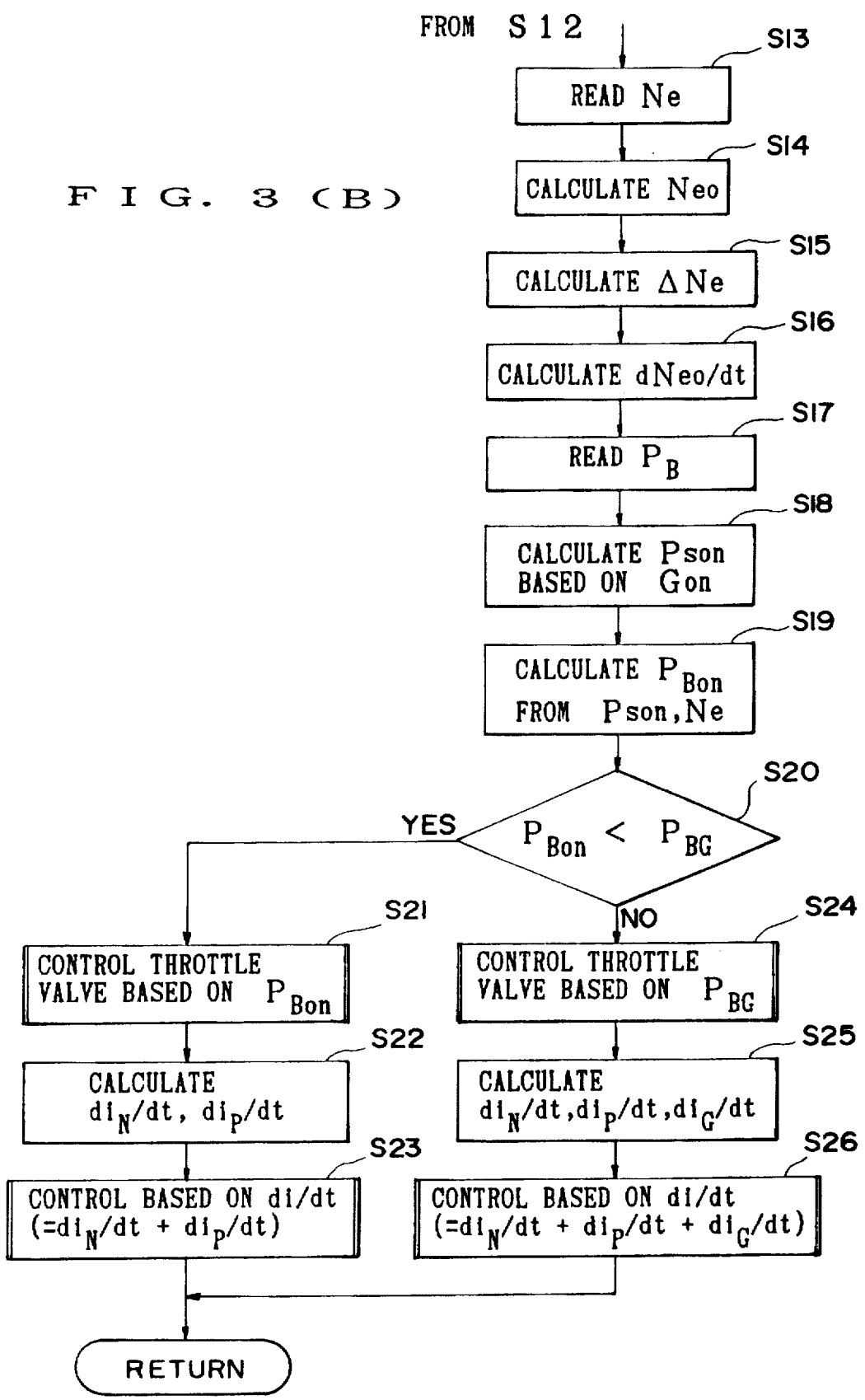
Figure 4:
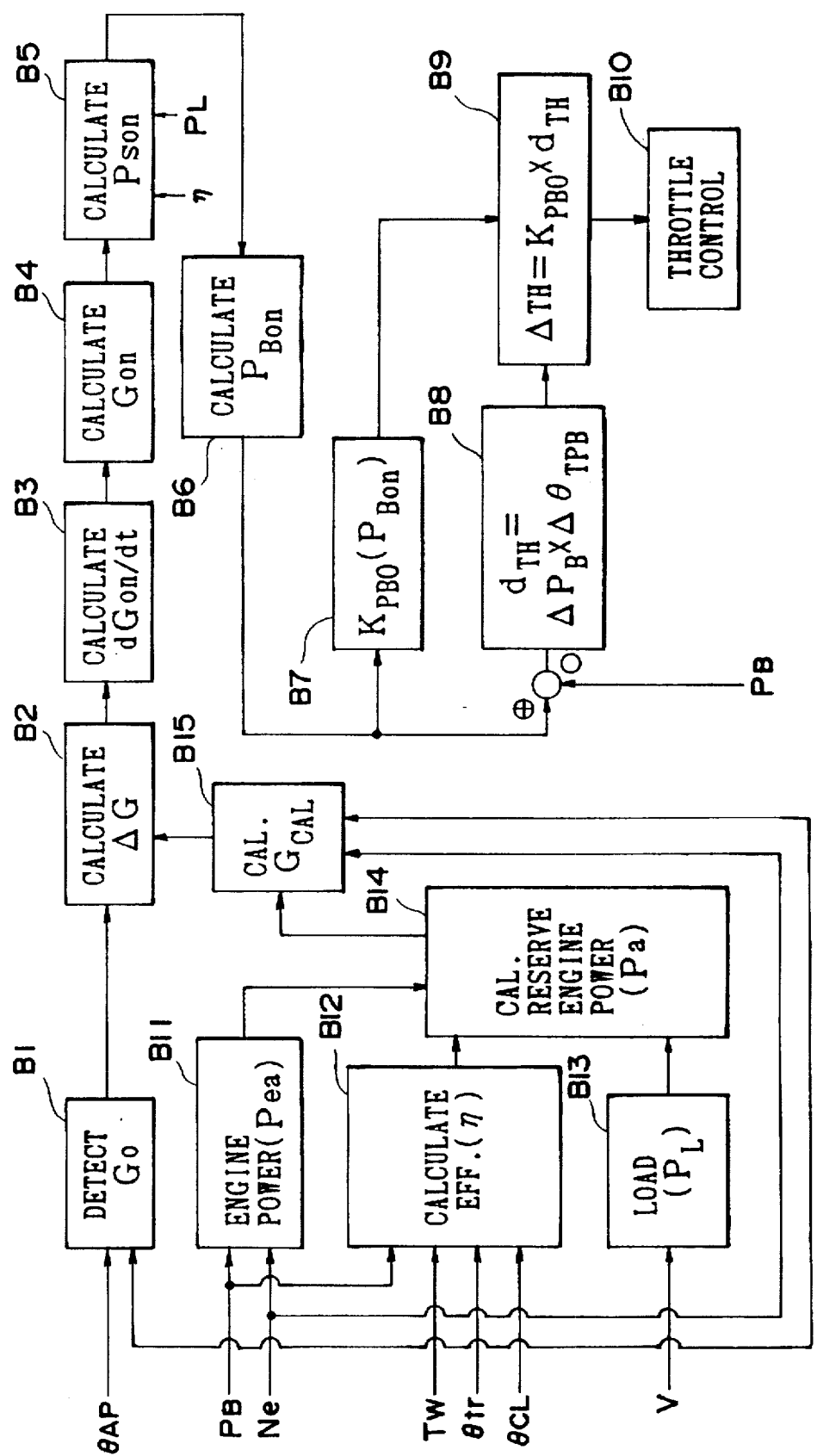
FIGS. 4 and 5 are block diagrams showing throttle valve and transmission control processes according to the present invention.

As shown in FIG. 3, an acceleration opening (the amount of depression of the accelerator pedal) $\theta_{AP}$ is read in a step S1, and then a vehicle speed V is read in a step S2.

Figure 6A:
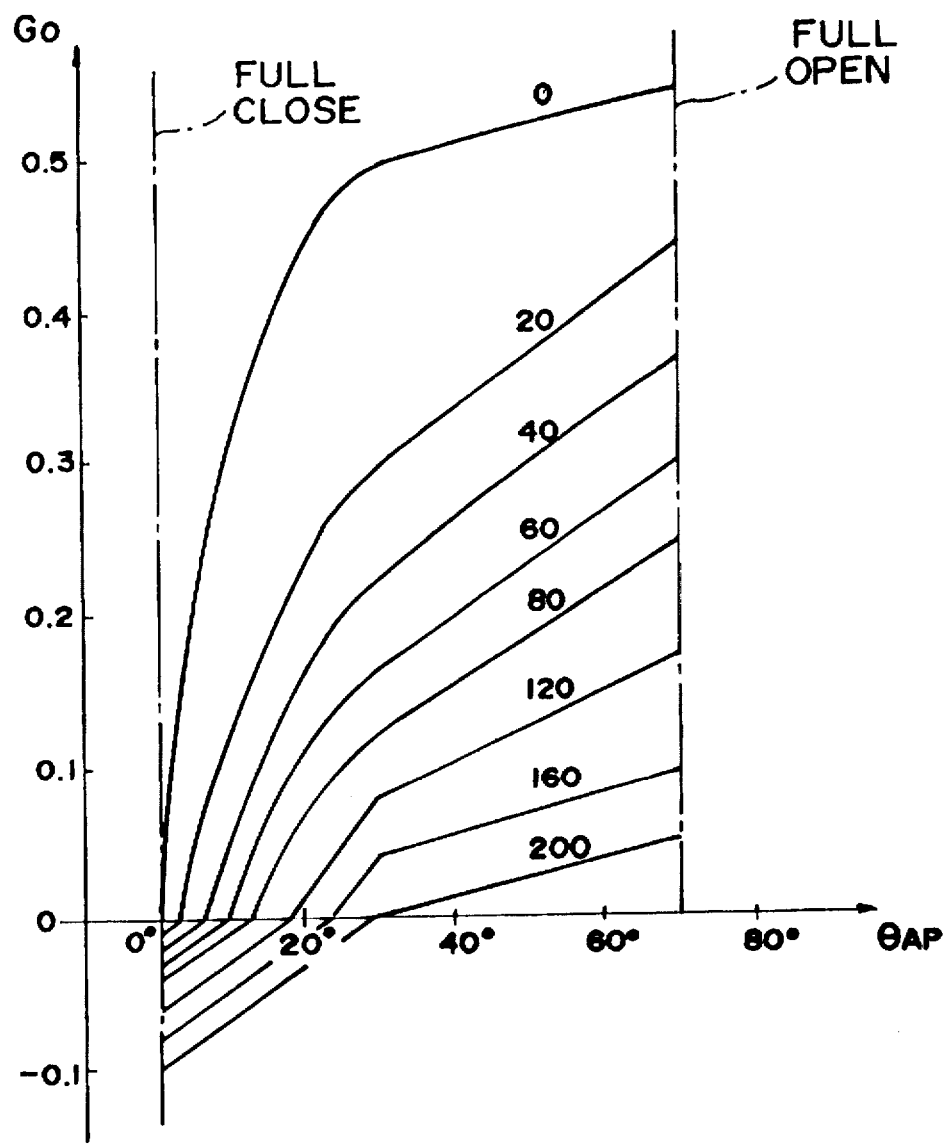
FIGS. 6A through 6C are graphs showing target acceleration maps used in the control processes.

Steps S3, S4 determine whether a shift range is an L range, an S range, or a D range, and steps S5, S6, S7 select a Go map corresponding to the determined shift map. The shift range means a gear range which is established depending on the position of a shift lever which is manipulated by the driver. The Go map for the D range is shown in FIG. 6A, the Go map for the S range in FIG. 6B, and the Go map for the L range in FIG. 6C.

Figure 5:
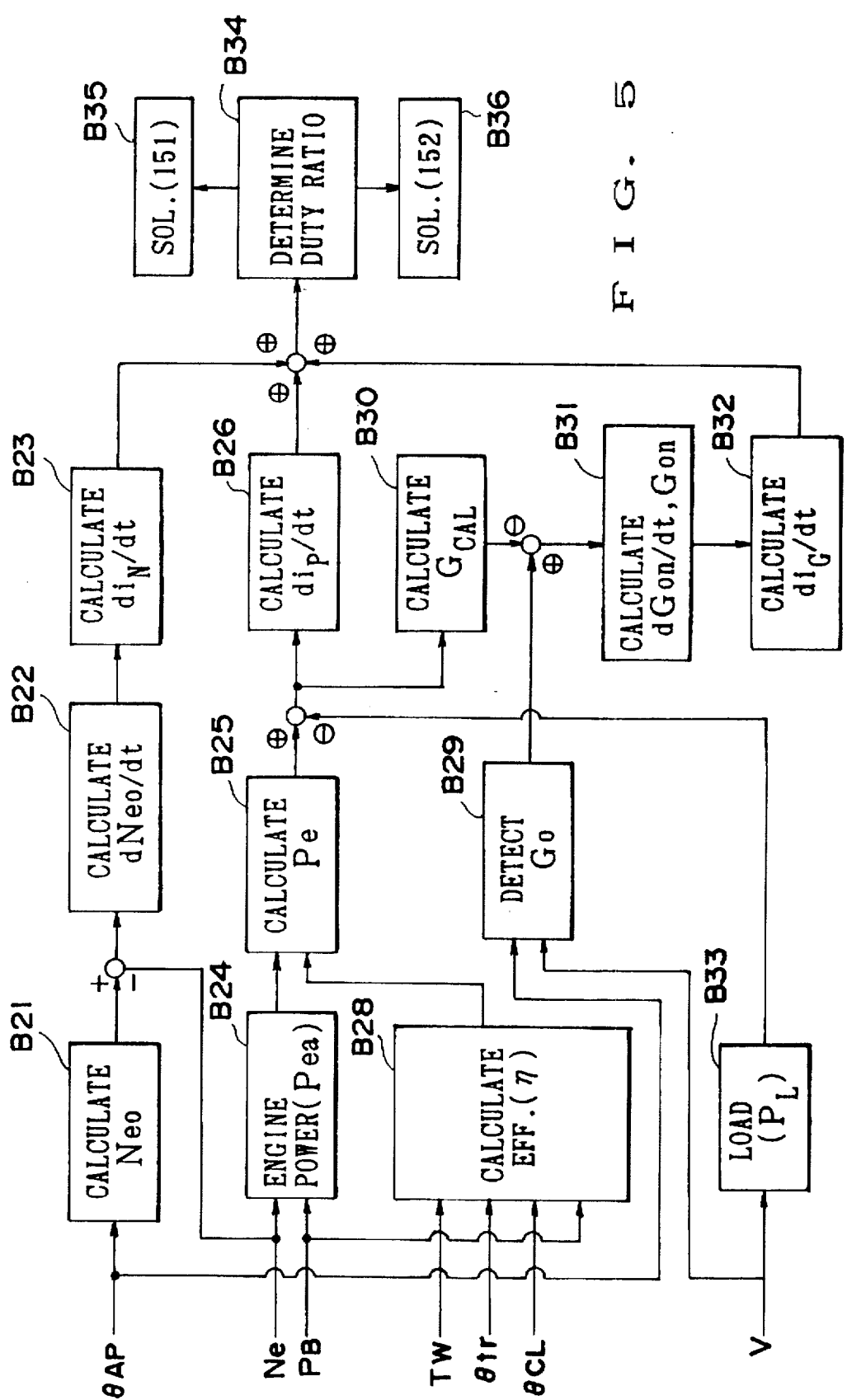
Figure 6B:
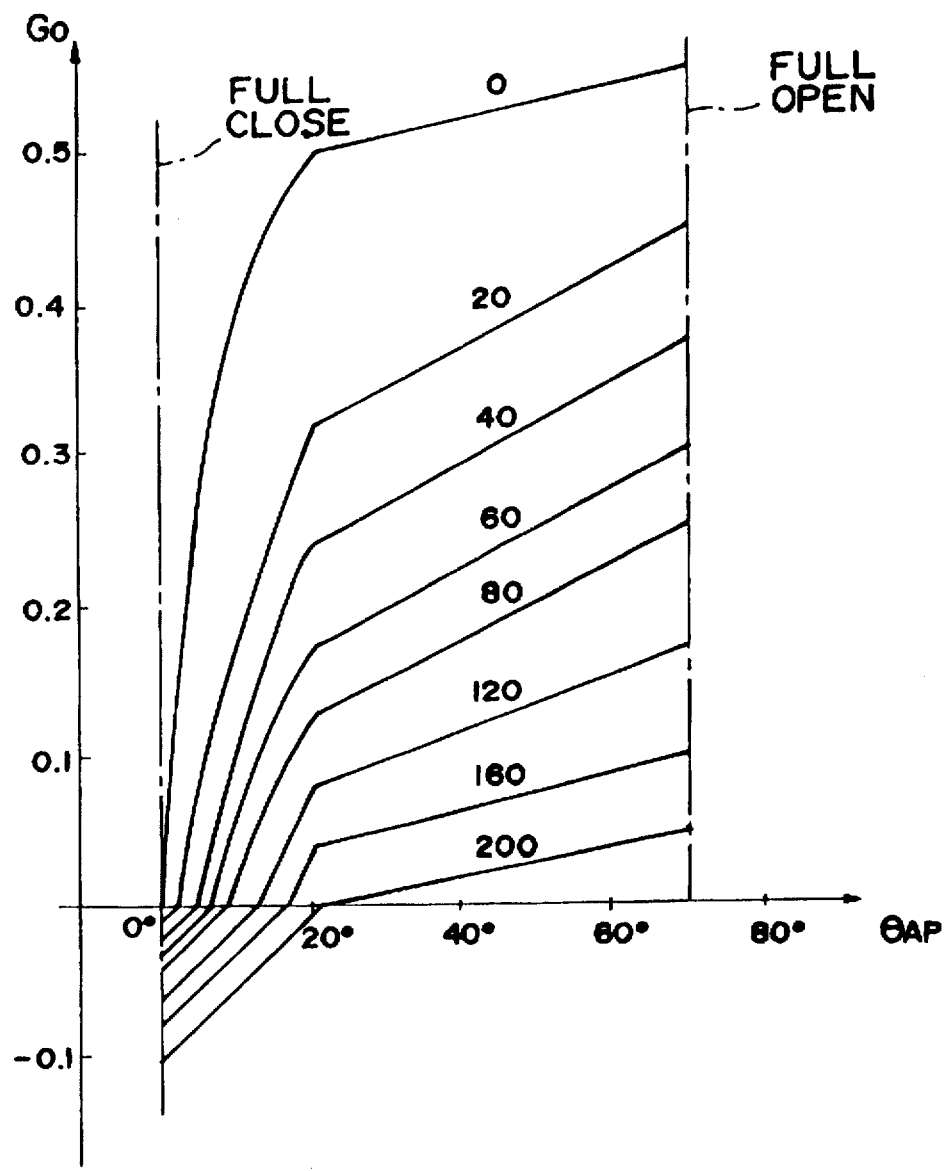
Figure 6C:
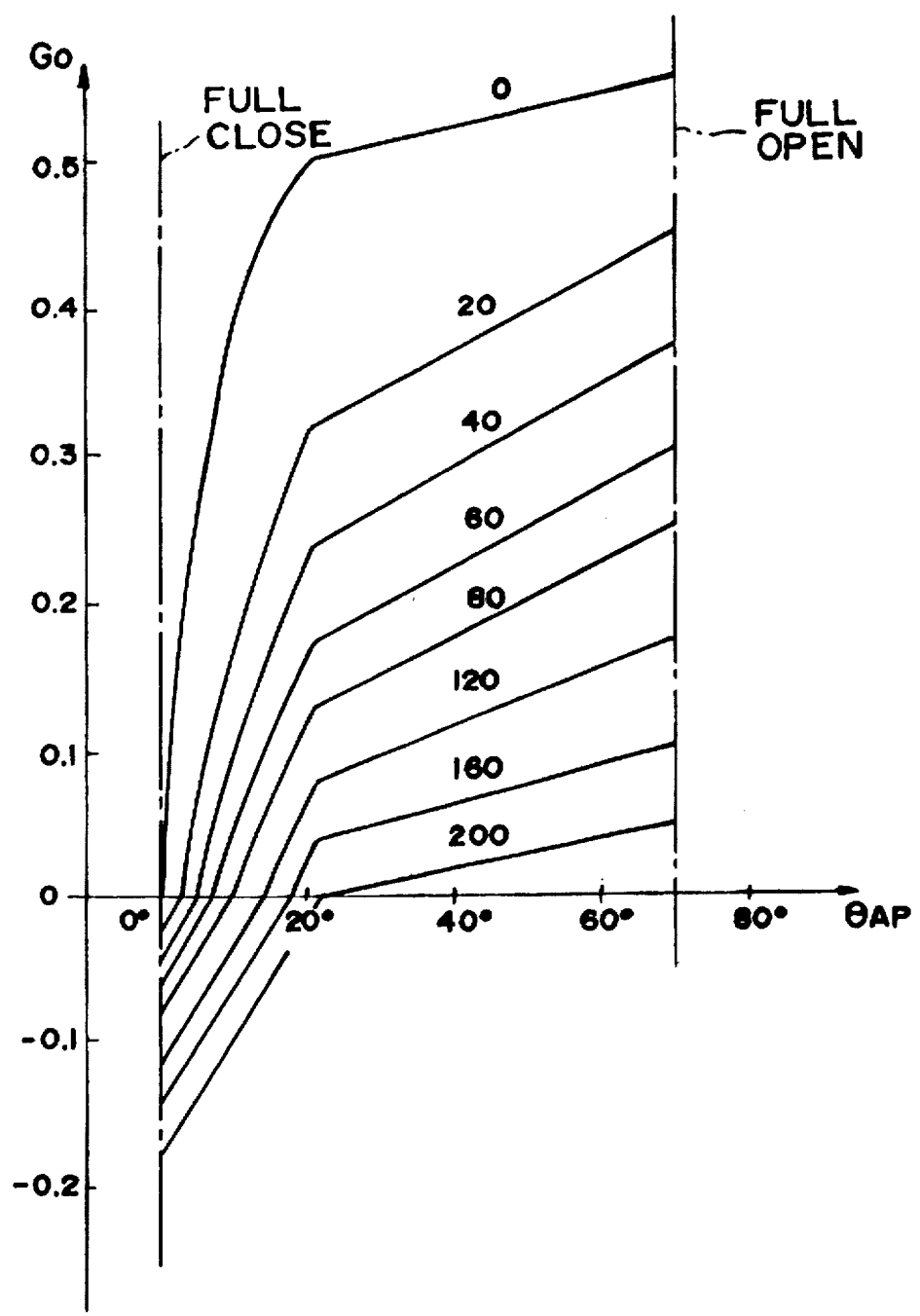

Thereafter, a target acceleration Go to be reached is determined from the accelerator opening $\theta_{AP}$ and the vehicle speed V in a step S8, a block B1 (FIG. 4), and a block B29 (FIG. 5). As shown in FIGS. 6A through 6C, there are preset maps representing curves indicating desired target accelerations Go to be reached for respective vehicle speeds, the target accelerations Go being plotted against the accelerator openings $\theta_{AP}$. A target acceleration Go to be reached which corresponds to the accelerator opening $\theta_{AP}$ and the vehicle speed V that are thus read is read from the target acceleration maps, so that the target acceleration for obtaining a desired driver's acceleration feeling corresponding to the accelerator pedal depression at the vehicle speed can be achieved. The numerical values allotted to the respective curves in the target acceleration maps indicate vehicle speeds in the unit of km/h.

In the target acceleration maps, the curves indicative of the target accelerations corresponding to the vehicle speeds are spaced at substantially equal intervals. Particularly, the distances between the curves at cruising speeds (i.e., vehicle speeds at which the target acceleration is zero) are proportional to the cruising speeds. Stated otherwise, the cruising speed is proportional to the accelerator opening $\theta_{AP}$. For example, the change in the accelerator opening at the time the cruising speed varies from 0 km/h to 20 km/h is the same as the change in the accelerator opening at the time the cruising speed varies from 20 km/h to 40 km/h.

Furthermore, the gradient of the curves corresponding to the vehicle speeds is larger as the accelerator opening $\theta_{AP}$ is smaller. Specifically, when the accelerator opening $\theta_{AP}$ is smaller, the rate at which the target acceleration increases upon depression of the accelerator pedal is larger, and when the accelerator opening $\theta_{AP}$ is larger, the rate is smaller.

When the accelerator opening $\theta_{AP}$ is small, the acceleration as felt by the driver upon depression of the accelerator pedal tends to be small. According to the present invention, at this time, the rate at which the target acceleration increases is large, allowing the driver to have an acceleration feeling which matches his intention for acceleration.

The graphs shown in FIGS. 6A through 6C contain regions where the target acceleration Go is negative. In those regions, there are established target decelerations to be reached when the accelerator pedal is released while the motor vehicle is running, applying an engine brake to decelerate the motor vehicle.

Reading of the target accelerations will be described in specific detail. If the map shown in FIG. 6A is employed, when the accelerator pedal is depressed until the accelerator opening becomes about 40 degrees while the motor vehicle is cruising at 60 km/h (the accelerator opening is about 10 degrees during the cruising), a point on the curve for the vehicle speed of 60 km/h at the accelerator opening of 40 km/h is determined, and the target acceleration (=about 0.2 Go) which corresponds to the determined point is read.

Then, a reserve power Pa of the engine at the present time is calculated according to the equation (5) above. Actually, as shown in FIG. 4, an actual engine output power Pea is determined on the basis of the intake vacuum pressure $P_B$ and the engine rotational speed Ne in a block B11, a transfer efficiency η for the engine output power is determined on the basis of the intake vacuum pressure $P_B$, the coolant temperature $T_W$, the swash plate angle θtr, and the clutch opening $θ_{CL}$ in a block B12, and a running load $P_L$, i.e., the sum of a road resistance Rμ and an air resistance Ra, is determined on the basis of the vehicle speed V in a block B13. Then, the reserve power Pa can be determined using the equation (5). At this time, the engine output power Pea is corrected by the transfer efficiency η.

In FIG. 5, the engine output power Pea is determined in a block B24, the transfer efficiency η is determined in a block B28, and an engine output power Pe which is actually transferred is calculated in a step B25. Then, the reverse power is determined by subtracting the load $P_L$ which has been determined in a block B33 from the engine output power Pe.

Then, a calculative acceleration $G_{CAL}$ corresponding to the reserve power of the engine thus determined is calculated in a step S9, a block B15, and a block B30. A predicted acceleration is calculated using the reserve power Pa according to the equation (7), and the predicted acceleration thus determined is the calculative acceleration $G_{CAL}$.

Figure 7:
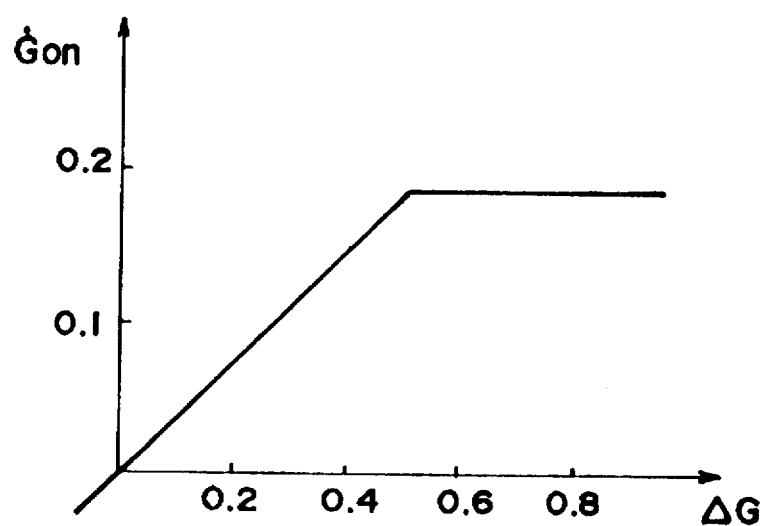
FIG. 7 is a graph showing the relationship between acceleration differences and corrective values for acceleration.

The difference ΔG (=Go−$G_{CAL}$) between the target acceleration Go to be reached and the calculative acceleration $G_{CAL}$ is calculated in a step S10 and a block B2. Based on the acceleration difference ΔG, a corrective value ΔGon for the calculative acceleration $G_{CAL}$, which is necessary to vary the present acceleration (calculative acceleration $G_{CAL}$) up to the target acceleration Go to be reached along a desired characteristic curve, is calculated on the basis of the acceleration difference ΔG in a step S11, a block B3, and a block B31. The corrective value ΔGon is determined, for example, using a map or graph as shown in FIG. 7 which contains calculated corrective values corresponding to different values of the acceleration difference ΔG. Therefore, the desired corrective value ΔGon corresponding to the present acceleration difference ΔG calculated in the step S10 can be found in the graph of FIG. 7 according to the solid-line curve therein.

Then, the corrective value ΔGon is added to the calculative acceleration acceleration $G_{CAL}$ to obtain a present target acceleration Gon (=$G_{CAL}$+ΔGon) in a step S12, a block B4, and a block B31. This present target acceleration Gon is an acceleration which is required at the present time to vary the present acceleration $G_{CAL}$ up to the target acceleration Go to be reached along the desired characteristic curve. The throttle valve opening and the speed reduction ratio of the transmission are controlled in order to obtain the target acceleration Gon.

Figure 8:
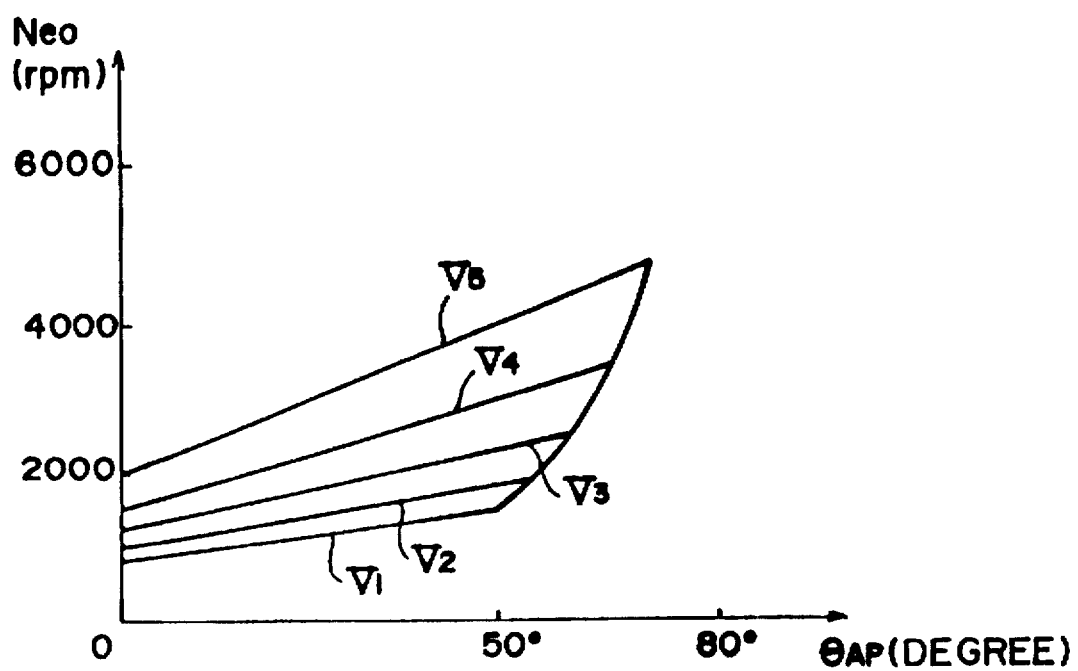
FIG. 8 is a graph showing the relationship between accelerator openings, vehicle speeds, and target accelerations to be reached.

For such control, the engine rotational speed Ne is read in a step S13, and then a target engine rotational speed Neo which corresponds to the accelerator opening $θ_{AP}$ and the vehicle speed V that have already been read in is calculated in a step S14 and a block B21. As shown in FIG. 8, values of the target engine rotational speed Neo are preset for the vehicle speeds $V_1$ through $V_5$ and plotted against values of the accelerator opening $θ_{AP}$. Therefore, the target engine rotational speed Neo is determined which corresponds to the present accelerator opening $θ_{AP}$ and vehicle speed Neo that have been read in the steps S1, S2.

Figure 9:
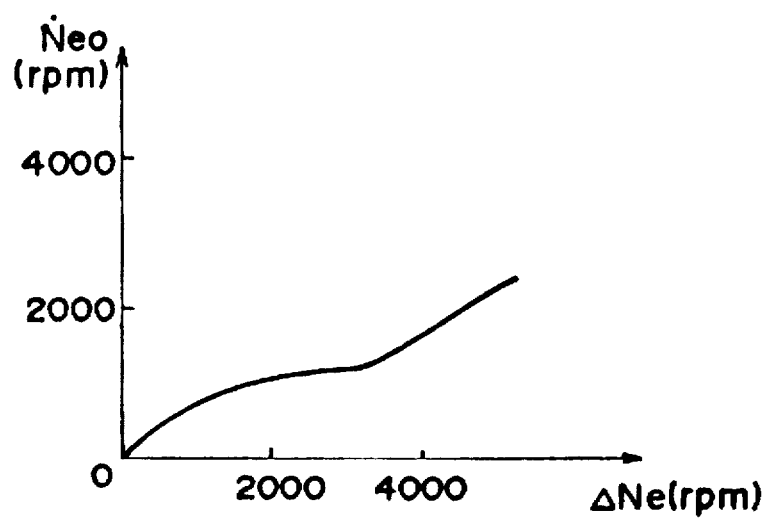
FIG. 9 is a graph showing the relationship between rotational speed differences and rates of change of a target engine rotational speed.

Then, a step S15 calculates the difference ΔNe(=Neo−Ne) between the target engine rotational speed Neo and the present engine rotational speed Neo read in the step S13. Based on the rotational speed difference ΔNe, a present target rate dNeo/dt of change of the engine rotational speed, which rate is required to vary the present engine rotational speed Ne up to the target rotational speed Neo along a desired characteristic curve, is calculated and temporarily stored in a memory in a step S16 and a block B22. The target rate dNeo/dt is determined from the graph of FIG. 9, for example, which contains preset rates of change of the engine rotational speed such that the engine rotational speed will vary along a desired characteristic curve depending on the rotational speed difference ΔNe.

Then, control goes to a step S17 in which the intake vacuum pressure $P_B$ of the engine as detected by the vacuum sensor 162 is read, and a present engine horsepower Pe is calculated according to the intake vacuum pressure $P_B$ and the engine rotational speed Ne. Thereafter, a target engine horsepower Pson required to obtain the target acceleration Gon is determined according to the following equation (10) in a step S18 and a block B5:

$$Pson = \frac{Gon \times (W + \Delta W) \times V \times 10^3}{60^2 \times 75} + Pe \quad (10)$$

Figure 10:
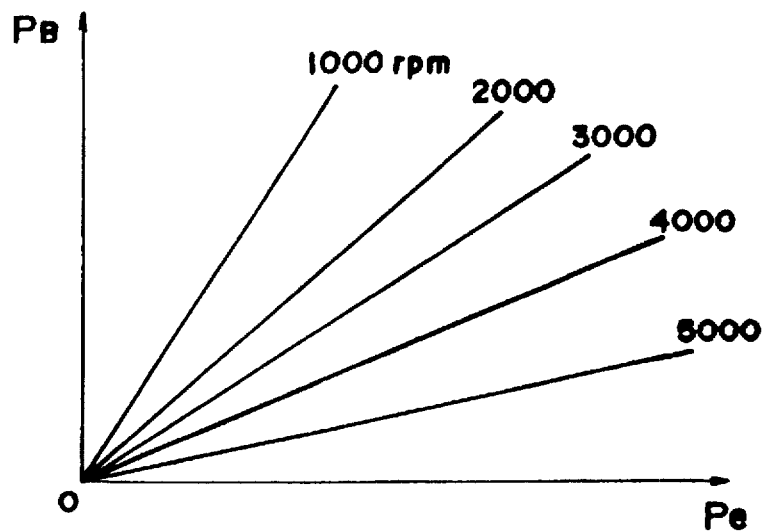
FIG. 10 is a graph showing the relationship between engine powers, engine rotational speeds, and intake vacuum pressures.

With the target engine horsepower Pson thus calculated, a target intake vacuum $P_{Bon}$, which is required to vary the present engine horsepower Pe up to the target engine horsepower Pson at the engine rotational speed Ne at this time, is calculated in a step S19 and a block B6 For such a calculation, a map (FIG. 10) containing values of the engine horsepower Pe depending on values of the engine intake vacuum pressure $P_B$ and values of the engine rotational speed Ne may be employed, and the engine horsepower corresponding to the target engine horsepower Pson and the engine rotational speed Ne may be determined from the map.

The throttle valve of the engine may then be controlled in order to achieve the target intake vacuum $P_{Bon}$ which is thus obtained. However, when the throttle valve opening is reduced smaller than a predetermined opening and the intake vacuum pressure becomes higher than a predetermined level $P_{BG}$, the engine horsepower is very small, and the throttle valve opening control is not effective enough to adjust the engine horsepower.

To cope with the above shortcoming, a step S20 determines whether the target intake vacuum pressure $P_{Bon}$ is lower than the predetermined value $P_{BG}$ or not, so that different control modes will be performed if $P_{Bon}<P_{BG}$ and if $P_{Bon} \geq P_{BG}$.

Figure 11:
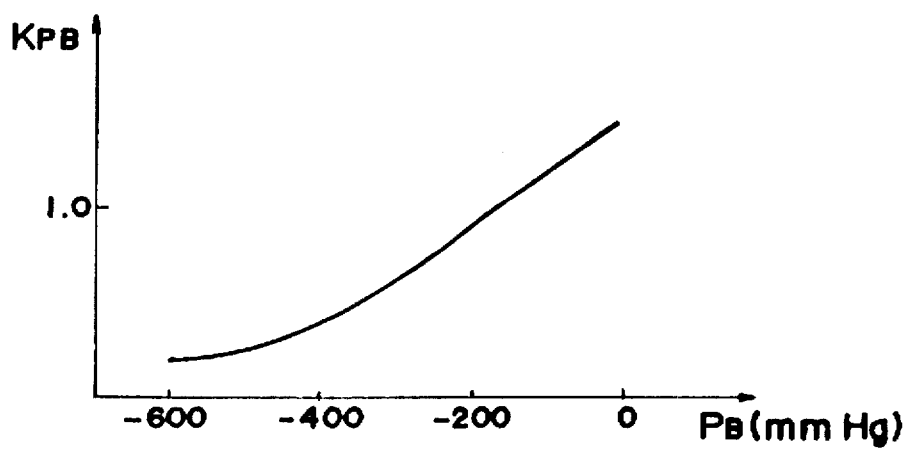
FIG. 11 is a graph showing the relationship between intake vacuum pressures and operation gains of a throttle valve actuator.
Figure 12:
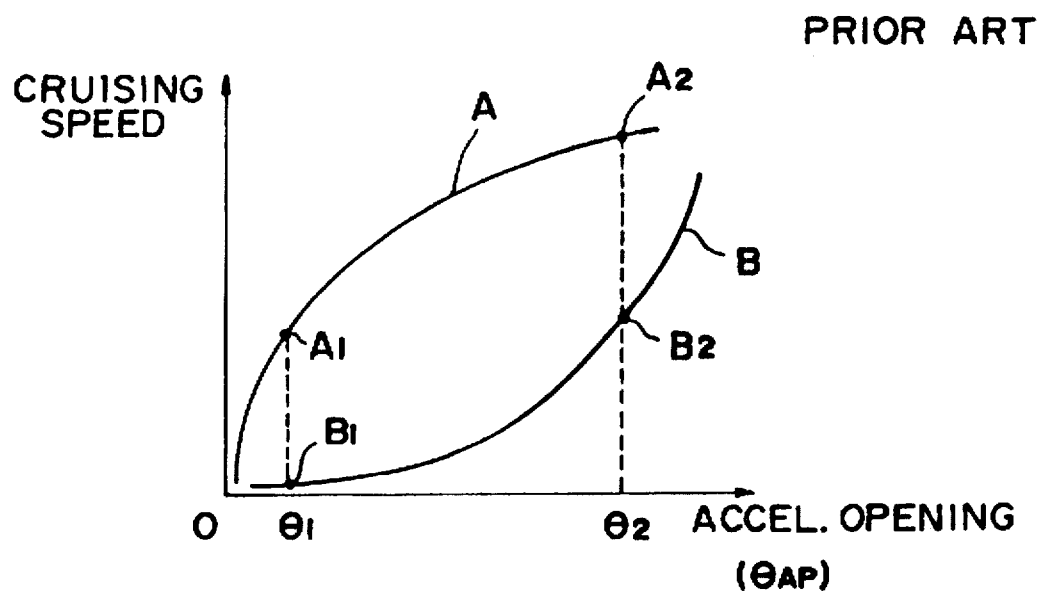
FIGS. 12 through 14 are graphs showing, respectively, the relationship between accelerator openings and cruising speeds, the relationship between accelerator openings and drive powers, and the relationship between amounts of depression of an accelerator pedal and rates of change of an acceleration with respect to the amounts of depression of the accelerator pedal.
Figure 13:
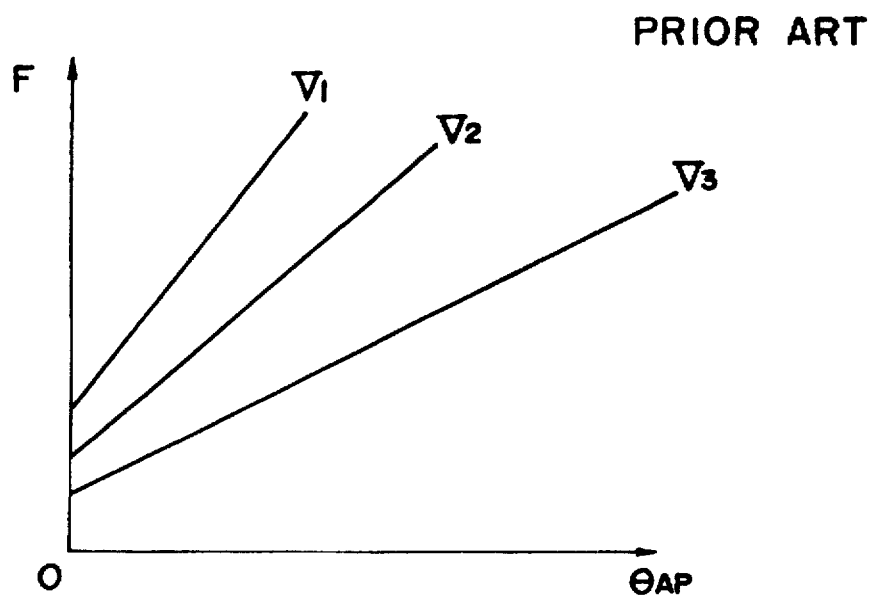
Figure 14:
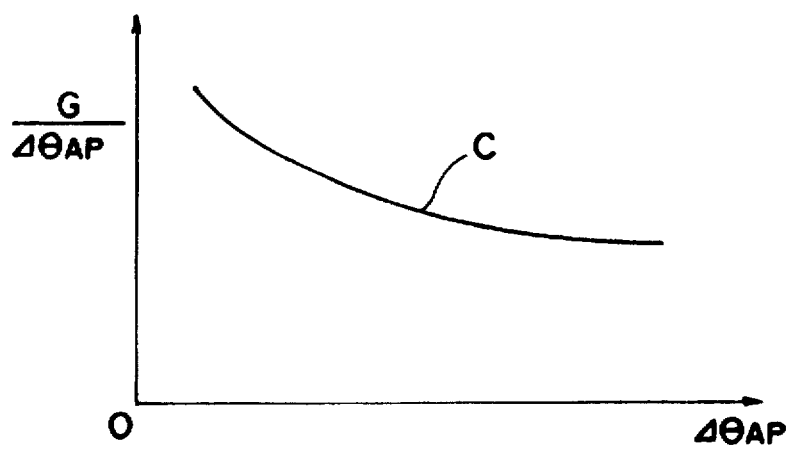

If $P_{Bon}<P_{BG}$, then the engine throttle valve is controlled so that the target intake vacuum $P_{Bon}$ will be obtained in a step S21. The engine throttle valve control process is shown in blocks B7 through B10 of FIG. 4. First, the difference $\Delta P_B$ between the target intake vacuum pressure $P_{Bon}$ and the actual intake vacuum pressure $P_B$ is determined, and the difference $\Delta P_B$ is multiplied by a coefficient $\Delta θ_{TPB}$, thus obtaining a basic throttle change value $d_{TH}$ in the block B8. The coefficient $\Delta θ_{TPB}$ is a coefficient which represents a change in the throttle opening which is required to effect a unit change in the intake vacuum pressure. Concurrent with this, a corrective coefficient $K_{PBO}$ for an operation gain of the throttle valve actuator 155 with respect to the target intake vacuum pressure $P_{Bon}$ is determined in the block B7. The operation gain is corrected because the amount of operation of the throttle valve actuator and the intake vacuum pressure are not proportionally related to each other. As illustrated in FIG. 11, the corrective coefficient $K_{PBO}$ is determined by reading a gain corresponding to the target intake vacuum pressure $P_{Bon}$ from the predetermined relationship between intake vacuum pressures $P_B$ and operation gains of the throttle valve actuator 155.

Then, the intake vacuum pressure difference $d_{TH}$ is multiplied by the corrective coefficient $K_{PBO}$ to determine an amount of operation ΔTH of the throttle valve actuator 155 which is required to vary the intake vacuum pressure by the difference $d_{TH}$ in the block B9. The throttle valve actuator 155 is now operated by the amount of operation $\Delta_{TH}$ thereby to control the throttle valve. Now, an engine horsepower which is suitable and required to reach the target acceleration Gon can be generated.

Simultaneously with this throttle valve control, the speed reduction ratio of the continuously variable transmission is also controlled. To this end, a component $di_N/dt$ (=$C_1 \times 1/V \times dNeo/dt$) corresponding to the target rate dNeo/dt of change of the engine rotational speed and a component $di_p/dt$ (=$-C_2 \times Ne/V^3 \times Pa$: this can be obtained according to the equation (8)) corresponding to the predicted acceleration that is determined using the reserve power Pa of the engine are determined in a step S22, a block B23, and a block B26. By substituting these components in the equation (9), a rate di/dt (=$di_N/dt+di_p/dt$) of change of the speed reduction ratio is determined, and the duty ratio of the solenoid-operated valves 151, 152 is determined in order to obtain the rate di/dt in a block B34. Based on the duty ratio, the solenoid-operated valves 151, 152 are controlled in operation for controlling the speed reduction ratio. In this manner, the motor vehicle can be accelerated (or decelerated) according to the target acceleration Gon.

If $P_{Bon} \geq P_{BG}$, then control goes from the step S20 to a step S24 in which the engine throttle valve is controlled so that the intake vacuum pressure $P_B$ is equalized to the predetermined value $P_{BG}$ (constant). Since the engine horsepower cannot be adjusted by the throttle valve control at this time, the transmission control is effected to make up for the engine horsepower adjustment. Using the difference (Gon-$G_{CAL}$) between the target acceleration Gon and the calculative acceleration $G_{CAL}$, a corrective component $di_G/dt$ is calculated according to the following equation (11) in a step S25 and a block B32:

$$di_G/dt = C_3 \times \frac{Ne}{V^2} \times (Gon - G_{CAL}) \quad (11)$$

The corrective component $di_G/dt$ is then added to the equation (9) to calculate a rate di/dt (=$di_N/dt+di_p/dt+do_G/dt$) of change of the speed reduction ratio. Then, the duty ratio of the solenoid-operated valves 151, 152 is determined in order to reach the rate di/dt of change in the speed reduction ratio, and the solenoid-operated valves 151, 152 are controlled on the basis of the duty ratio, thereby controlling the speed reduction ratio. The motor vehicle can also be accelerated (or decelerated) according to the target acceleration Gon.

The above flow or control sequence is cyclically repeated every preset period of time (e.g., every 10 ms) for continuously controlling the speed reduction ratio along a desired acceleration (or deceleration) characteristic curve. If the speed reduction ratio is controlled through the duty ratio control of the solenoid-operated valves as with the illustrated embodiment, then a control signal for the solenoid-operated valves is issued every 100 ms, for example, even though the control sequence is repeated every 10 ms, because the mechanical parts of the solenoid-operated valves have slow responses.

While the amount of depression of the accelerator pedal is used as an indication of the driver's intention for acceleration or deceleration in the above embodiment, the engine throttle opening may instead be used as such an indication.

The control method of the present invention has been described as being applied to a continuously variable transmission which comprises a hydraulic pump and hydraulic motor. However, the principles of the present invention are also applicable to any of various other types of continuously variable transmission.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. A method of controlling a speed reduction ratio of a continuously variable transmission on a motor vehicle operated by a driver, comprising the steps of:

detecting a first indication representative of an intention by the driver for acceleration or deceleration of the motor vehicle and a second indication representative of a speed of the motor vehicle;

determining a target acceleration to be reached which corresponds to said first and second indications, from a target acceleration map which contains a plurality of target accelerations corresponding to a plurality of values of the first indication representative of the driver's intention for acceleration or deceleration and a plurality of values of the second indication representative of speeds of the motor vehicle, said target acceleration map being arranged such that when each value of said second indication is constant, each of said target accelerations increases as the value of said first indication increases and at a rate which is greater when the value of said first indication is smaller; and controlling the speed reduction ratio of the transmission so that said target acceleration will be reached.

2. A method according to claim 1, wherein a cruising speed of the motor vehicle in said target acceleration map varies linearly as the values of said first indication vary.

3. A method according to claim 1, wherein said target acceleration map includes a plurality of maps respectively corresponding to a plurality of shift ranges, and one of the maps corresponding to the present shift range is used to determine the value of the target acceleration.

4. A method according to claim 1, wherein said first indication corresponds to an amount of depression of an accelerator pedal.

5. A method according to claim 1, wherein said continuously variable transmission has a hydraulic pump drivable by said engine and a hydraulic motor drivable by oil pressure supplied from said hydraulic pump, at least one of said hydraulic pump and said hydraulic motor being of variable displacement type, said method further comprising the step of:

controlling said continuously variable transmission by controlling the variable displacement either of said hydraulic pump or said hydraulic motor.

6. A method according to claim 1, further comprising the steps of:

calculating a calculative acceleration $G_{CAL}$ at the present time on the basis of a reserve power Pa of the engine which drives the transmission;

establishing a target present acceleration Gon required at the present time to vary the present acceleration up to the target acceleration Go along a desired characteristic curve according to the difference $\Delta G$ (=$Go-G_{CAL}$) between said target acceleration Go and said calculative acceleration $G_{CAL}$; and controlling said transmission so that said target present acceleration Gon will be reached.

7. A method according to claim 6, wherein said calculative acceleration $G_{CAL}$ is determined on the basis of said reserve power Pa of the engine according to the equation:

$$G_{CAL} = Pa \times \frac{g \times 60^2 \times 75}{(W + \Delta W) \times (V \times 10^3)}$$

where
g: the gravitational acceleration;
W: the total weight of the motor vehicle;
$\Delta W$: an equivalent weight of rotational parts of the engine; and
V: the speed of the motor vehicle.

8. A method according to claim 6, further comprising the steps of:
controlling a throttle valve of the engine as well as controlling the transmission so that said target present acceleration will be reached.

9. A method according to claim 8, further comprising the steps of:
calculating a present engine horsepower $P_{SRL}$ from an engine intake vacuum $P_B$ and an engine rotational speed Ne;
determining a target engine horsepower Pson required to obtain said target present acceleration Gon according to the equation:

$$P_{son} = \frac{Gon \times (W + \Delta W) \times V \times 10^3}{60^2 \times 75} + P_{SRL}$$

where
W: the total weight of the motor vehicle;
$\Delta W$: an equivalent weight of rotational parts of the engine; and
V: the speed of the motor vehicle;
calculating a target engine intake vacuum $P_{Bon}$ required to vary said present engine horsepower $P_{SRL}$ up to said target engine horsepower Pson at said engine rotational speed Ne; and
comparing the target intake vacuum $P_{Bon}$ with a predetermined value $P_{BG}$, then controlling the throttle valve of the engine so that either said target intake vacuum $P_{Bon}$ will be obtained when the target intake vacuum $P_{Bon}$ is lower than the predetermined value $P_{BG}$ or an intake vacuum valve equal to the predetermined value $P_{BG}$ will be obtained when the target intake vacuum $P_{Bon}$ is equal to or higher than the predetermined value $B_{BG}$.

10. A method according to claim 9, wherein a map indicative of a correlation between the engine intake vacuum $P_B$, the engine rotational speed Ne, and the engine horsepower Ps is established, and said present engine horsepower $P_{SRL}$ and said target intake vacuum $P_{Bon}$ are determined from said map.

11. A method according to claim 8, wherein said throttle valve is controlled by a throttle valve actuator which is operable in response to a control signal from a controller.

12. A method according to claim 9, further comprising the steps of:
when said target intake vacuum $P_{Bon}$ is lower than said predetermined value $P_{BG}$, calculating a target engine rotational speed Neo corresponding to the value of the indication of the driver's intention for acceleration or deceleration and the value of the indication of the speed of the motor vehicle, and also calculating the difference $\Delta Ne$ ($=Neo-Ne$) between the target engine rotational speed Neo and the present engine rotational speed Ne;
calculating a target rate dNeo/dt of change of the engine rotational speed, which is required at the present time to vary the present engine rotational speed Ne up to said target engine rotational speed Neo along a desired characteristic curve, based on said difference $\Delta Ne$;
determining a component $di_N/dt$ corresponding to said target rate dNeo/dt according to the equation:

$$di_N/dt = C_1 \times \frac{1}{V} \times (dNeo/dt)$$

where $C_1$: a constant;
determining a component $di_p/dt$ corresponding to a predicted acceleration, using the reserve horsepower Pa of the engine, according to the equation:

$$di_p/dt = -C_2 \times (Ne/V^3) \times Pa$$

where $C_2$: a constant;
adding said components $di_N/dt$ and $di_p/dt$, thereby determining a rate di/dt of change of the speed reduction ratio of the transmission; and
controlling the speed reduction ratio of the transmission so that said rate di/dt of change of the speed reduction ratio will be obtained.

13. A method according to claim 9, further comprising the steps of:
when said target intake vacuum $P_{Bon}$ is equal to or higher than said predetermined value $P_{BG}$, calculating a target engine rotational speed Neo corresponding to the value of the indication of the driver's intention for acceleration or deceleration and the value of the indication of the speed of the motor vehicle, and also calculating the difference $\Delta Ne$ ($=Neo-Ne$) between the target engine rotational speed Neo and the present engine rotational speed Ne;
calculating a target rate dNeo/dt of change of the engine rotational speed, which is required at the present time to vary the present engine rotational speed Ne up to said target engine rotational speed Neo along a desired characteristic curve, based on said difference $\Delta Ne$;
determining a component $di_N/dt$ corresponding to said target rate dNeo/dt according to the equation:

$$di_N/dt = C_1 \times \frac{1}{V} \times (dNeo/dt)$$

where $C_1$: a constant;
determining a component $di_p/dt$ corresponding to a predicted acceleration, using the reserve horsepower Pa of the engine, according to the equation:

$$di_p/dt = -C_2 \times \frac{Ne}{V^3} \times Pa$$

where $C_2$: a constant;
determining a corrective component $di_G/dt$ according to the equation:

$$di_G/dt = C_3 \times \frac{Ne}{V^2} (Gon - G_{CAL})$$

where $C_3$: a constant;
adding said components $di_N/dt$, $di_p/dt$, and $di_G/dt$, thereby determining a rate di/dt of change of the speed reduction ratio of the transmission; and
controlling the speed reduction ratio of the transmission so that said rate di/dt of change of the speed reduction ratio will be obtained.

14. A method of controlling a speed reduction ratio of a continuously variable transmission on a motor vehicle operated by a driver, comprising the steps of:

detecting a first indication representative of an intention of the driver for acceleration or deceleration of the motor vehicle and a second indication representative of a speed of the motor vehicle;

determining a target acceleration to be reached which corresponds to said first and second indications, from a target acceleration map which contains a plurality of target accelerations corresponding to a plurality of values of the indication representative of the driver's intention for acceleration or deceleration and a plurality of values of the second indication representative of speeds of the motor vehicle, said target acceleration map being arranged such that a cruising speed of the motor vehicle in said target acceleration map varies linearly as said values of the first indication vary; and controlling the speed reduction ratio of the transmission so that said target acceleration will be reached.

15. A method according to claim 14, wherein said target acceleration map includes a plurality of maps respectively corresponding to a plurality of shift ranges, and one of the maps corresponding to the present shift range is used to determine the target acceleration value.

16. A method according to claim 14, further comprising the steps of:

calculating a calculative acceleration $G_{CAL}$ at the present time on the basis of a reserve power Pa of the engine which drives the transmission;

establishing a target present acceleration Gon required at the present time to vary the present acceleration up to the target acceleration Go along a desired characteristic curve according to the difference $\Delta G(=Go-G_{CAL})$ between said target acceleration Go and said calculative acceleration $G_{CAL}$; and controlling said transmission so that said target present acceleration Gon will be reached.

17. A method according to claim 16, further comprising the steps of:

controlling a throttle valve of the engine as well as controlling the transmission so that said target present acceleration will be reached.

18. A method according to claim 17, further comprising the steps of:

calculating a present engine horsepower $P_{SRL}$ from an engine intake vacuum $P_B$ and an engine rotational speed Ne;

determining a target engine horsepower Pson required to obtain said target present acceleration Gon according to the equation:

$$Pson = \frac{Gon \times (W + \Delta W) \times V \times 10^3}{60_2 \times 75} = P_{SRL}$$

where

W: the total weight of the motor vehicle;

$\Delta W$: an equivalent weight of rotational parts of the engine; and

V: the speed of the motor vehicle;

calculating a target engine intake vacuum $P_{Bon}$ required to vary said present engine horsepower $P_{SRL}$ up to said target engine horsepower Pson at said engine rotational speed Ne; and comparing the target intake vacuum $P_{Bon}$ with a predetermined value $P_{BG}$, then controlling the throttle valve of the engine so that either said target intake vacuum $P_{Bon}$ will be obtained when the target intake vacuum $P_{Bon}$ is lower than the predetermined value $B_{BG}$ or an intake vacuum valve equal to the predetermined value $P_{BG}$ will be obtained when the target intake vacuum $P_{Bon}$ is equal to or higher than the predetermined value $P_{BG}$.

* * * * *

UNITED STATES PATENT AND TRADEMARK OFFICE
CERTIFICATE OF CORRECTION

PATENT NO. : 5,754,428
DATED : May 19, 1998
INVENTOR(S) : Ishikawa

It is certified that error appears in the above-identified patent and that said Letters Patent is hereby corrected as shown below:

<u>Column 14,</u>
Line 50, after "displacement" delete "either of" and insert -- of either --.

Signed and Sealed this

Seventh Day of May, 2002

Attest:

Attesting Officer

JAMES E. ROGAN
*Director of the United States Patent and Trademark Office*